United States Patent
Massey (10) Patent No.: US 9,346,555 B2
(45) Date of Patent: May 24, 2016

(54) ON BOARD INERT GAS GENERATION SYSTEM WITH ROTARY POSITIVE DISPLACEMENT COMPRESSOR

(75) Inventor: Alan Massey, Southampton (GB)

(73) Assignee: EATON LIMITED, Hampshire (GB)

( * ) Notice: Subject to any disclaimer, the term of this patent is extended or adjusted under 35 U.S.C. 154(b) by 79 days.

(21) Appl. No.: 13/991,930

(22) PCT Filed: Nov. 29, 2011

(86) PCT No.: PCT/EP2011/071325
§ 371 (c)(1),
(2), (4) Date: Jul. 19, 2013

(87) PCT Pub. No.: WO2012/076373
PCT Pub. Date: Jun. 14, 2012

(65) Prior Publication Data
US 2013/0294950 A1 Nov. 7, 2013

(30) Foreign Application Priority Data
Dec. 8, 2010 (GB) .................................. 1020783.5

(51) Int. Cl.
| | |
|---|---|
| *B64D 37/32* | (2006.01) |
| *B64D 13/08* | (2006.01) |
| *B64D 37/24* | (2006.01) |
| *F02C 7/25* | (2006.01) |
| *A62C 3/08* | (2006.01) |
| *A62C 99/00* | (2010.01) |

(52) U.S. Cl.
CPC ............... *B64D 37/32* (2013.01); *B64D 13/08* (2013.01); *B64D 37/24* (2013.01); *A62C 3/08* (2013.01); *A62C 99/0018* (2013.01); *F02C 7/25* (2013.01); *Y02T 50/56* (2013.01)

(58) Field of Classification Search
CPC .. F02C 7/25; B64D 37/32; B64D 2013/0677; A62C 3/08; A62C 99/0018
See application file for complete search history.

(56) References Cited

U.S. PATENT DOCUMENTS

| | | | |
|---|---|---|---|
| 2,648,488 A | 8/1953 | Paget | |
| 3,893,300 A | 7/1975 | Connell | |
| 4,262,495 A * | 4/1981 | Gupta et al. | ..................... 62/402 |
| 4,482,114 A | 11/1984 | Gupta et al. | |
| 4,502,283 A | 3/1985 | Wandel | |
| 4,968,219 A * | 11/1990 | Fisher-Votava | .................. 416/53 |

(Continued)

FOREIGN PATENT DOCUMENTS

| | | |
|---|---|---|
| EP | 1433704 A1 | 6/2004 |
| EP | 2163476 A2 | 3/2010 |

OTHER PUBLICATIONS

Aviation Rulemaking Advisory Committee, "Fuel Tank Inerting Harmonization Working Group", Team Reports, Jun. 2001, pp. 1-688; accessed on Feb. 25, 2015 at http://www.fire.tc.faa.gov/pdf/systems/ARAC_FTIHWG_Team_Reports.pdf.*

*Primary Examiner* — Lorne Meade
(74) *Attorney, Agent, or Firm* — Leydig, Voit & Mayer, Ltd.

(57) ABSTRACT

An on board inert gas generation system receives cabin air, or air from another relatively low pressure source, passing a portion thereof through an energy recovery turbine to ambient to extract power which is used to provide all, or part of, the energy required to drive a positive displacement compressor to compress another portion of cabin air to increase the pressure thereof to be suitable for supply to an air separation module.

18 Claims, 5 Drawing Sheets

(56) References Cited

U.S. PATENT DOCUMENTS

| | | | | |
|---|---|---|---|---|
| 5,845,848 | A | 12/1998 | Amako et al. | |
| 6,273,936 | B1 | 8/2001 | Barry et al. | |
| 6,415,621 | B2* | 7/2002 | Buchholz et al. | 62/402 |
| 6,729,359 | B2 | 5/2004 | Jones | |
| 6,913,636 | B2 | 7/2005 | Defrancesco et al. | |
| 6,926,490 | B2* | 8/2005 | McAuliffe et al. | 415/1 |
| 6,962,056 | B2* | 11/2005 | Brasz et al. | 60/772 |
| 6,997,970 | B2 | 2/2006 | Crome | |
| 7,013,905 | B2 | 3/2006 | Jones et al. | |
| 7,048,231 | B2 | 5/2006 | Jones | |
| 7,204,868 | B2* | 4/2007 | Snow, Jr. | 96/4 |
| 7,264,647 | B2 | 9/2007 | Meckes et al. | |
| 7,273,507 | B2* | 9/2007 | Schwalm | 55/467 |
| 7,296,399 | B2* | 11/2007 | Hoff, Jr. | 60/273 |
| 7,300,494 | B2* | 11/2007 | Schwalm et al. | 95/54 |
| 7,306,646 | B2* | 12/2007 | Wong | 95/45 |
| 7,385,692 | B1 | 6/2008 | Nguyen | |
| 7,410,526 | B2* | 8/2008 | Haas et al. | 95/90 |
| 7,430,858 | B2* | 10/2008 | Hoff, Jr. | 60/309 |
| 7,481,214 | B2* | 1/2009 | Eilers | 128/200.24 |
| 7,574,894 | B2 | 8/2009 | Austerlitz et al. | |
| 7,594,545 | B2* | 9/2009 | Love | 169/45 |
| 7,625,434 | B2 | 12/2009 | Tom et al. | |
| 7,828,874 | B2* | 11/2010 | Surawski et al. | 95/14 |
| 7,845,188 | B2* | 12/2010 | Brutscher et al. | 62/402 |
| 8,114,198 | B2* | 2/2012 | Isella | 96/4 |
| 8,192,532 | B1 | 6/2012 | Gupita | |
| 8,500,878 | B2 | 8/2013 | Cremers et al. | |
| 8,753,429 | B2 | 6/2014 | Lam et al. | |
| 8,801,931 | B2 | 8/2014 | Liu et al. | |
| 8,857,767 | B2 | 10/2014 | Stolte et al. | |
| 2002/0162915 | A1 | 11/2002 | Mitani | |
| 2003/0233936 | A1 | 12/2003 | Crome | |
| 2004/0025507 | A1* | 2/2004 | Leigh et al. | 60/608 |
| 2004/0065778 | A1 | 4/2004 | Jones | |
| 2005/0223895 | A1 | 10/2005 | Wong | |
| 2005/0229968 | A1 | 10/2005 | Jones et al. | |
| 2005/0247197 | A1 | 11/2005 | Snow, Jr. | |
| 2006/0117956 | A1 | 6/2006 | Schwalm | |
| 2006/0292018 | A1 | 12/2006 | Jones | |
| 2007/0004326 | A1 | 1/2007 | Haas et al. | |
| 2008/0060523 | A1 | 3/2008 | Tom et al. | |
| 2009/0078828 | A1 | 3/2009 | Sugai et al. | |
| 2010/0132920 | A1 | 6/2010 | Casas Noriega et al. | |
| 2011/0031353 | A1 | 2/2011 | Stolte et al. | |
| 2011/0062288 | A1 | 3/2011 | Cremers et al. | |
| 2013/0139521 | A1 | 6/2013 | Massey et al. | |
| 2013/0294950 | A1* | 11/2013 | Massey | 417/410.1 |
| 2013/0341465 | A1* | 12/2013 | Massey et al. | 244/134 R |
| 2014/0053726 | A1 | 2/2014 | Evosevich et al. | |
| 2014/0326135 | A1* | 11/2014 | Massey et al. | 95/39 |
| 2014/0331857 | A1* | 11/2014 | Massey et al. | 95/8 |
| 2015/0000523 | A1 | 1/2015 | Jojic et al. | |
| 2015/0027305 | A1 | 1/2015 | Evosevich et al. | |

* cited by examiner

ON BOARD INERT GAS GENERATION SYSTEM WITH ROTARY POSITIVE DISPLACEMENT COMPRESSOR

CROSS-REFERENCE TO RELATED APPLICATIONS

This application is a U.S. national phase application under 35 U.S.C. §371 of International Application PCT/EP2011/071325, filed on Nov. 29, 2011, and claims benefit to British Patent Application No. GB 1020783.5, filed on Dec. 8, 2010. The international application was published in English on Jun. 14, 2012, as WO 2012/076373 A2 under PCT Article 21(2).

FIELD

An aspect of invention relates to an on board inert gas generation system for generation of inert gas on board an aircraft to facilitate inerting of the fuel tanks and/or other areas on board the aircraft.

BACKGROUND

In this specification the widely accepted terminology is employed with the term 'inert gas generation' meaning the generation of an oxygen depleted or 'nitrogen-enriched atmosphere' (NEA). In recent years the move towards the use of composites in the construction of aircraft wings has meant that the temperatures within the fuel tanks are greater than those in wings of conventional material due to the lower thermal conduction of the composite. Thus there is an even greater need for effective inerting of the aircraft fuel tanks in composite wings due to the greater temperatures experienced. It is well known to use one or more filters or 'air separation modules' (ASMs) which allow separation of a supply of inlet air into a nitrogen-enriched air portion (NEA) and an oxygen-enriched air portion (OEA). In order to run air separation modules efficiently, they need to be supplied with inlet air at a relatively high pressure (typically 40 psig ($2.76 \times 10^5$ Pag) or more). It is possible to operate at lower pressures but this would mean that more air separation modules would be required with the consequent increase in weight and complexity, which is undesirable. By way of illustration if the air supplied to an ASM is at 15 psig, then ten ASMs would be required each weighing approximately 27 kg. But if the inlet air is at 56 psig only two ASMs are required to provide the required NEA capacity. In the past, the air separation modules have been supplied with high pressure bleed air from the main aircraft power plant. This has been bled off the compressor, cooled, filtered and then supplied to the ASM or ASMs. This system works well but there is an increasing demand on aircraft manufacturers to reduce the specific fuel consumption (SFC) of the aircraft. It is known that bleeding high pressure air from the compressor has an adverse effect on SFC and so there is now a trend to cease use of high pressure bleed air so that the engine performance can be optimised. This means that an alternative source of fluid for supply to the air separation module needs to be found and at an elevated pressure for the reasons given above.

US2006/0117956 describes an on board inert gas generation system which uses two compressors or stages arranged in series to provide compressed air to the air separation module. In order to provide high pressures to the air separation module, whilst coping with the severe strictures imposed by compressor rotor blade design limitations, US2006/0117956 provides a system in which two centrifugal compressors are run in series. The compressed air from the second stage is passed to an air separation module, but a vent is provided between the second stage compressor and the air separation module to enable the flow from the second compressor to be increased, which results in the second compressor having an increased output pressure whilst using the same compressor rotor blade design. Although this provides the centrifugal compressor with a wider operating range of output flows, it does mean that the operating efficiency is very poor at low flow rates. Since the aircraft operates at cruise during the major part of its operation, this means that for the majority of the time the centrifugal compressor arrangement is operating at well below its optimal operating efficiency.

Thus the inherent characteristics of a centrifugal compressor are ill-adapted for the operating regime and variations in the flow rates and pressures required during the cycle of ascent, cruise and descent of an aircraft and have resulted in unnecessarily complex solutions such as those set out above, which only partly tackle the issues. As noted, the ASM operates effectively at pressures above 40 psig ($2.76 \times 10^5$ Pag). Lower pressures require a larger ASM or several ASMs (and therefore increase weight) for a given duty, whilst higher pressures may exceed the maximum working pressure of the ASM. The flow requirement for an inerting system varies with flight phase. Descent requires the maximum NEA flow-rate as the inerting system is required to re-pressurise the fuel tanks to equalize the tank and ambient pressures. Cruise requires minimum flow-rate as the NEA flow-rate is only required to make up the increase in ullage volume created by fuel burn. The ratio between maximum descent flow and cruise flow is typically up to 6:1 depending on aircraft type, cruise altitude and descent rate. This does not fit well with typical centrifugal compressor characteristics which have a very narrow flow range bounded by the surge limit and the diffuser 'choking' limit. In a centrifugal compressor flow can be increased by increasing speed but the pressure generated increases as the square of the speed, and the power required increases by the cube of the speed. The additional pressure must be regulated to avoid damage to the ASM. This makes it very inefficient over the flow range required by an inerting system.

By contrast, we have found that the characteristics of a positive displacement type compressor are very well suited to provide the large variations in flow, because they provide a flow rate generally proportional to speed, at a pressure sufficient to supply the pressure required by the ASM and without the substantial pressure increases at higher flow rates, which can reduce ASM life. Therefore we have designed an on board inert gas generation system which is intended to obviate some of the problems encountered with centrifugal compressor based systems.

SUMMARY

In an embodiment, the present invention provides an on board inert gas generation system for use in an aircraft having a source of low pressure air. The gas generation system includes: a rotary positive displacement compressor including an inlet configured to receive a portion of the low pressure air; and an outlet in flow communication with an air separation module.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The term "low pressure air" used herein means air which is below the inlet pressure required by the air separation module. The low pressure air is typically at a pressure less than 40 psig and typically in the range of from 20 psig to 30 psig, and is advantageously cabin air. Cabin air is typically at 11 or 12 psia during cruise, although air at other pressures may be used.

The rotary positive displacement compressor is preferably a rotary continuous flow device. An example of a suitable rotary positive displacement compressor is a Twin Vortex System (TVS) Roots-type supercharger available from Eaton Corporation which has been designed for use in the automotive industry.

In order to provide at least some of the power to drive the compressor, the gas generation system may include a turbine for receiving and expanding a portion of cabin air. The turbine may be drivably connected to said positive displacement compressor to provide direct mechanical drive. Instead, or additionally, the turbine may be drivably connected to an electrical generator.

In a motor-driven configuration, an electric motor may be drivably connected to said positive displacement compressor, which conveniently receives electrical energy from said generator or an energy storage arrangement associated therewith. Furthermore, said electric motor may be connectable to receive electrical energy from an aircraft electrical supply. The motor may provide all the power required, or a portion thereof, with the balance being provided by shaft power, for example from a turbine as above.

A power controller is conveniently provided for selectively receiving electrical energy from said generator (or an electrical storage arrangement associated therewith), and electrical energy from the aircraft electrical supply, and for controllably supplying electrical energy to said electric motor.

The inert gas generation system may include a heat exchanger in the flow path between said positive displacement compressor and said air separation module, the heat exchanger having heating and cooling passes for fluid, with the air from said positive displacement compressor being passed along said cooling pass thereby to reduce the temperature of air supplied to said air separation module.

The heat exchanger may receive relatively cool ram air from a ram air duct. The system may include a duct for supplying cabin air to the heating pass of said heat exchanger and a duct for supplying said heated air from the heating pass of the heat exchanger to the input of said turbine. In this case a valve may be provided for selectively supplying relatively cool ram air or cabin air to said heat exchanger.

Preferably a portion of the compressed air from said positive displacement compressor is supplied to an ejector for enhancing flow of coolant along the heating pass of the heat exchanger when required.

In another aspect, this invention provides an on board inert gas generation system for use in an aircraft having a source of low pressure air, said inert gas generation system including a compressor having an inlet for receiving a portion of low pressure air and an outlet in flow communication with an air separation module, and a further portion of low pressure air to a turbine for receiving and for extracting therefrom at least a proportion of the energy required for driving the compressor. The low pressure air may be cabin air.

In yet another aspect, this invention provides a method for operating an on board inert gas generation system in an aircraft having a source of low pressure air, which comprises the steps of:
supplying a portion of said low pressure air to a rotary positive displacement compressor, and
supplying compressed air from said positive displacement compressor to an air separation module.

The invention also extends to an aircraft incorporating an on board inert gas generating system as set out above.

Whilst the invention has been described above, it extends to any inventive combination or sub-combination of any of the features disclosed herein alone or jointly with others.

The embodiments described below employ a positive displacement variable speed mechanically and/or electrically driven boost compressor to supply air at suitable pressure and flow to an air separation module to inert the fuel tanks of aircraft. An energy recovery turbine is combined with the compressor to reduce electrical power drain by using cabin air supply for both compressor and turbine.

The embodiments make use of passenger cabin air which is provided by the aircraft Environmental Control System (ECS) which requires power from the propulsion engines and increases engine specific fuel consumption. Having circulated through the cabin the air is then vented to atmosphere through overboard vent valves as a waste product. Using this air for fuel tank inerting purposes incurs no additional increase in Specific Fuel Consumption (SFC) as this has been paid for by the ECS. Cabin pressure is typically 11 or 12 psia at cruise altitude, which is too low for the air separation module (ASM) which separates the air into Nitrogen Enriched Air (NEA) and Oxygen Enriched Air (OEA) and which as noted typically operates at pressures in excess of 40 psig. From the ASM the OEA is vented overboard as a waste product and the NEA is passed to the fuel tanks to provide an inert ullage atmosphere. The embodiments below use a turbine to generate power during the cruise phase by using "free" cabin air to provide power to a variable speed positive displacement compressor.

Figure 1:
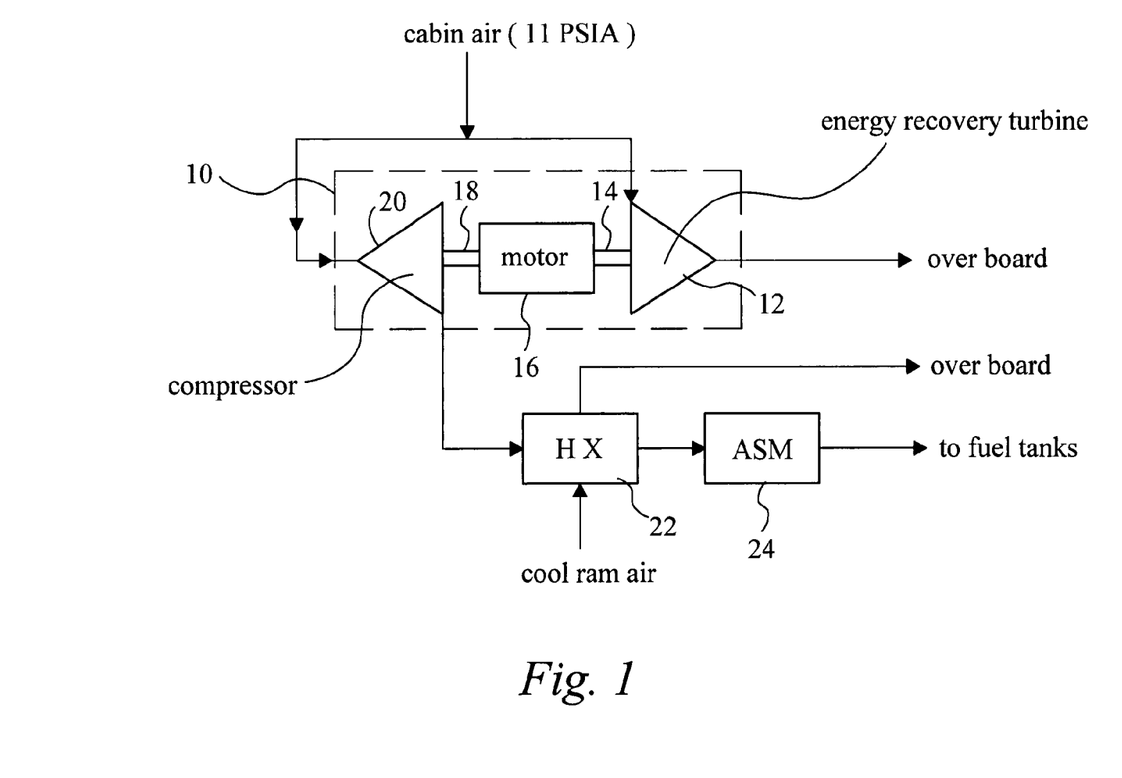
FIG. 1 is a block diagram of a first embodiment of on board inert gas generation system in accordance with this invention.

In the first embodiment, illustrated in FIG. 1, cabin air (typically at 11 Psia) ($0.76 \times 10^5$ Pa)) is supplied to a turbo compressor module 10 with a portion of the cabin air being supplied to an energy recovery turbine 12, with the outlet of the turbine 12 being vented overboard. The output shaft 14 of the turbine is connected either directly or via a gearbox or motor 16 to the input shaft 18 of a compressor 20. The compressed cabin air portion supplied from the compressor is passed to the cooling pass of a heat exchanger 22 and thence to an air separation module 24. The NEA from the air separator module 24 is then supplied to the aircraft fuel tanks for inerting. The OEA is vented overboard. The heat exchanger 22 receives relatively cold ram air which passes along the heating pass of the heat exchanger and then is vented overboard. The compressor 20 is a positive displacement compressor or pump designed to have a pressure ratio of between 2 and 4. Any suitable form of positive displacement compressor or pump may be used, similar to those used as superchargers for internal combustion engines and which may typically be based on a modified Roots-type positive displacement pump of a type which does not include internal pressure generation. An example of a suitable device is a Twin Vortex System (TVS) Roots-type supercharger available from Eaton Corporation which has been designed for use in the automotive industry. The Eaton TVS supercharger is a Roots-type positive displacement supercharger that in a typical example features twin four-lobe rotors that are twisted 160-degrees. The intermeshing, high-speed rotor design pumps air directly towards the outlet.

The positive displacement compressor may be a single stage or multistage device. In this embodiment, the use of a positive displacement compressor is capable of providing the high flow rates required for descent, without the substantial increase in output pressure that is inherent in a centrifugal compressor. Moreover, in some embodiments the power for the compressor may at least partially be supplied by 'free' energy from discharging the cabin air which will be discharged anyway by the cabin environmental control system.

Figure 2:
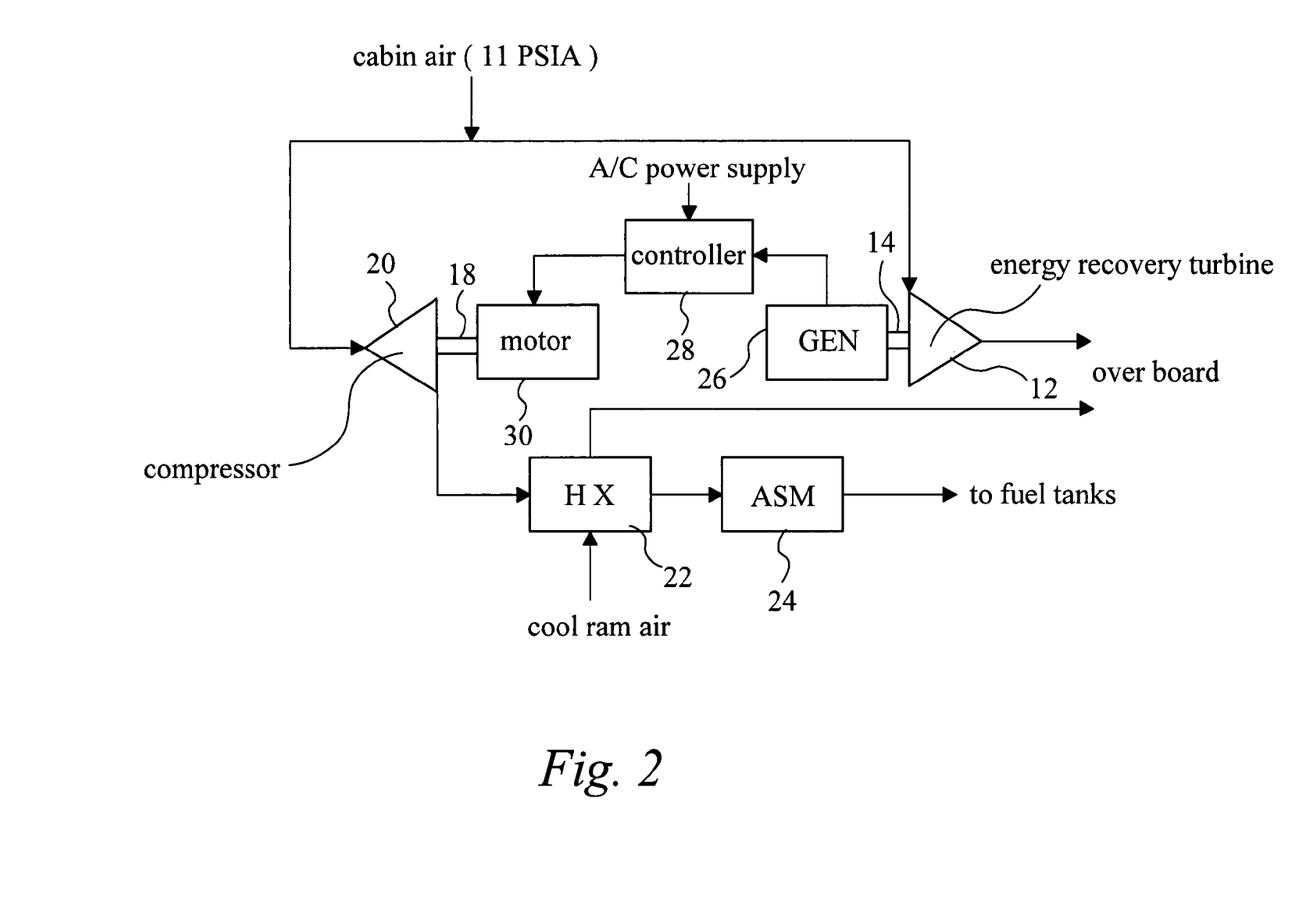
FIG. 2 is a block diagram of a second embodiment of on board inert gas generation system in accordance with this invention.

Referring to FIG. 2, the second embodiment is closely similar to the first embodiment and similar references will be used. Here the output drive of the energy recovery turbine 12 is supplied to a generator 26 which supplies electrical power to a controller 28 which is also capable of receiving electrical power from the aircraft power supply. The controller 28 supplies electrical power to a motor 30 which drives the drive shaft 18 of the positive displacement compressor 20. The electrical power controller combines and conditions the power produced by the turbine generator 26 with that from the aircraft's supply and controls the speed of the compressor as required for the requirements of cruise and descent.

Figure 3:
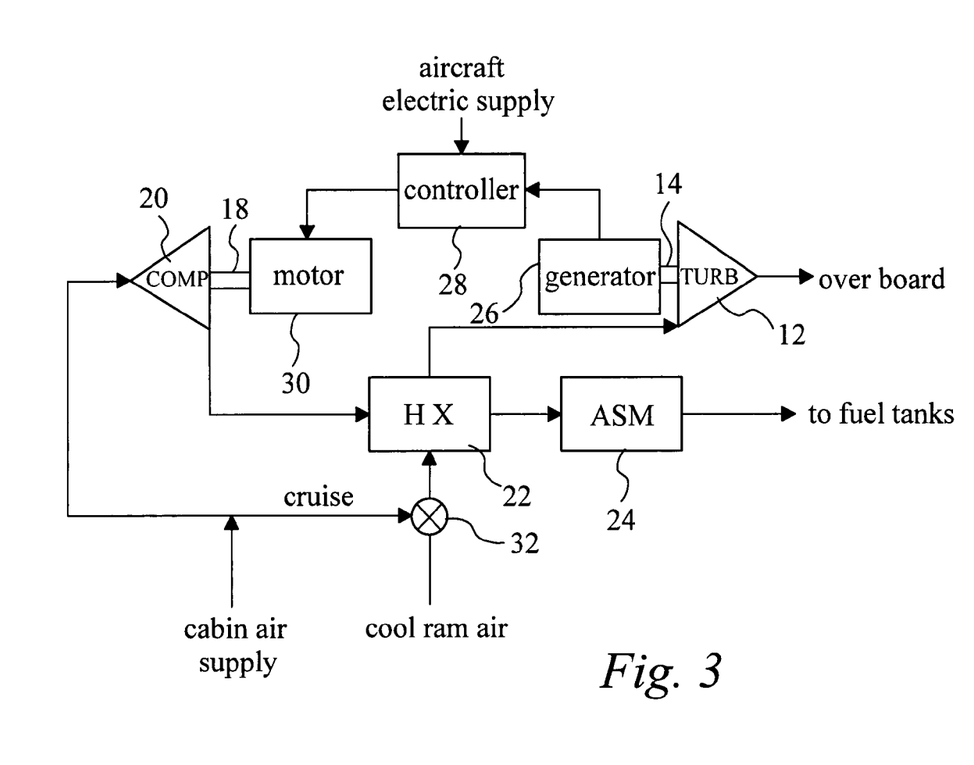
FIG. 3 is a block diagram of a third embodiment of on board inert gas generation system in accordance with this invention.

Referring now to FIG. 3, the third embodiment is generally similar to the second embodiment in several respects and similar references will be used. As previously, cabin air is used to drive an energy recovery turbine 12 which drives the generator 26 which supplies electrical power to the controller 28. A further portion of the cabin air is supplied to the positive displacement compressor 20. In the third embodiment, however, the portion of cabin air to be supplied to the turbine is initially passed through the heat exchanger 22, instead of ram air. This increases the temperature and thus the enthalpy of the cabin air portion supplied to the turbine and improves power extraction for a given turbine exit temperature, whilst cooling the portion supplied by the air separator module 24. The increased inlet temperature of the cabin air supplied to the turbine can also mitigate against icing of the turbine. As the aircraft descends the pressure ratio between the cabin and the atmosphere reduces with reducing altitude. This results in reduced turbine power and, via the speed control, the compressor takes an increasing amount of power from the aircraft electrical supply. On the ground the cabin/ambient pressure difference is zero so all the power required by the compressor must be supplied by the aircraft electrical supply. A valve 32 is provided upstream of the heat exchanger so that during descent, and on the ground, the valve may be operated to switch the cooling air for the heating pass from cabin air to ram air. Alternatively, a fan may be incorporated in the system to boost the flow rate of the cabin air portion to the heat exchanger when the cabin differential pressure is insufficient to provide the required cooling flow.

An important benefit of the various embodiments described herein is that it reduces SFC at cruise altitude where aircraft economics are most critical. Descent is a relatively short period where power consumption is less critical and, in any event, sufficient power may be available as large electrical loads (e.g. galley ovens) are not in demand in the descent phase, so the use of electrical power to drive the compressor does not impose constraints on aircraft electrical generator sizing.

Figure 4:
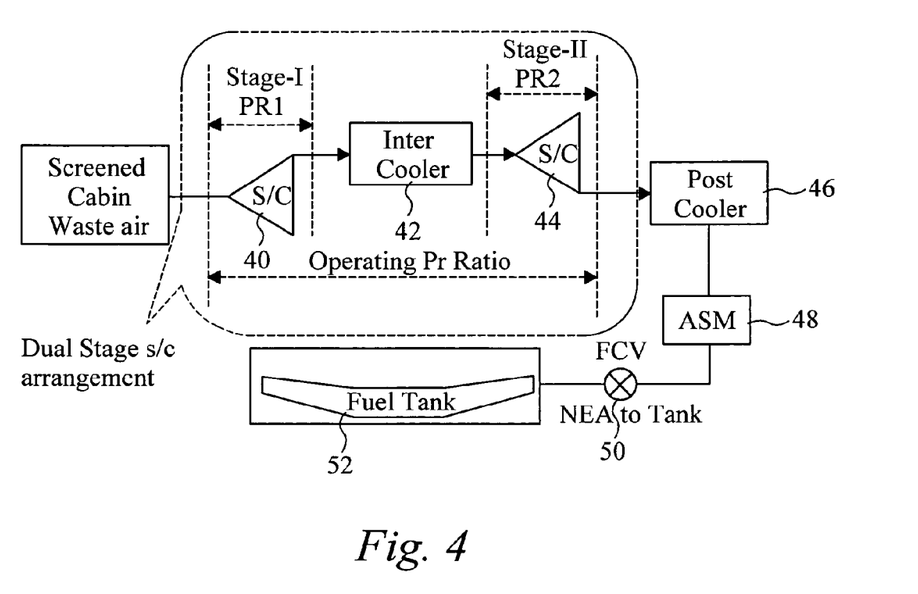
FIG. 4 is a block diagram of a fourth embodiment of on board inert gas generation system in accordance with this invention.

Referring now to FIG. 4, there is shown in schematic form a further embodiment in accordance with this invention in which the cabin waste air, following screening, is passed to a multiple stage positive displacement compressor arrangement comprising a first stage positive displacement compressor 40 which receives a portion of the cabin air and compresses it before it passes via an intercooler 42 to a second stage positive displacement compressor 44. The typical pressure ratio across each positive displacement compressor is in the range of from 1:4 to 1:6 for cabin air. The compressed cabin air from the second stage compressor 44 is then passed via a post-cooler 46 to the air separation module 48. The NEA fraction passes via a flow control valve 50 to the fuel tank 52.

Figure 5:
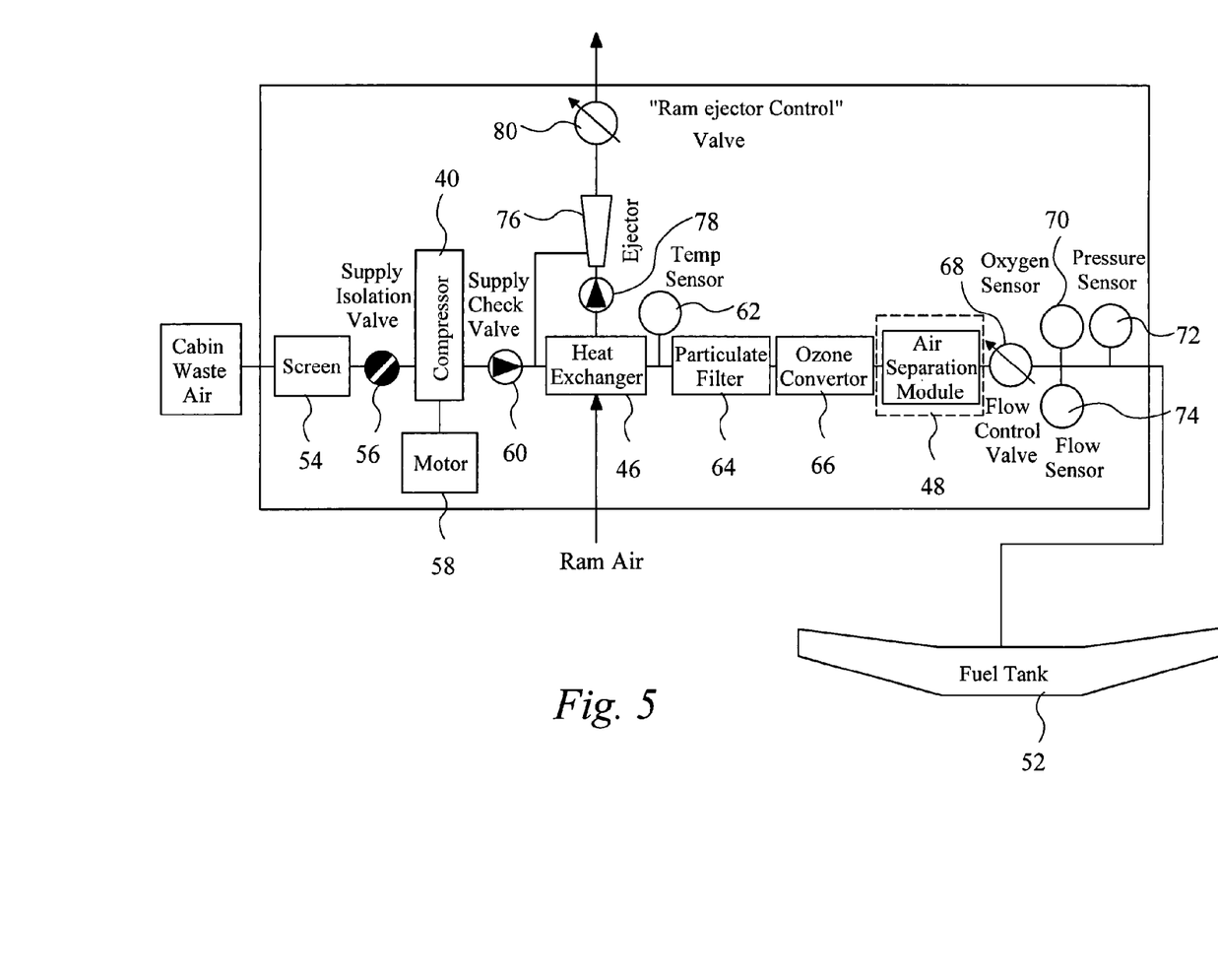
FIG. 5 is a block diagram of a fourth embodiment of on board inert gas generation system in accordance with this invention.

Referring now to FIG. 5, there is shown a more detailed arrangement of the arrangement of FIG. 4, in which similar components will be given similar reference numerals. The cabin waste air passes via a screening module 54 and a supply isolation valve 56 to a positive displacement compressor 40 which as previously may comprise a single or multi stage positive displacement compressor. The compressor is shown as being driven by a motor 58 but it may equally be driven at least partially or wholly by shaft power supplied e.g. from an expansion turbine. From the positive displacement compressor 40 the compressed cabin air passes via a supply check valve 60 into a heat exchanger 46 to pass along the cooling pass thereof. A temperature sensor 62 monitors the temperature of the air at the outlet of the heat exchanger 46 before it passes into a particulate filter 64, an ozone converter 66 and thence the air separation module 48. At the outlet of the air separation module 48 is a flow control valve 68 which controls flow of the NEA fraction into the fuel tank 52. The oxygen content, pressure and flow rate are detected by respective sensors 70, 72, 74.

In some situations such as where the aircraft is on the ground or low speed flight the ram air pressure may be insufficient to drive flow through the heat exchanger and in such conditions an ejector may be used. Thus a portion of the air from the compressor 40 may be tapped from the path between the supply check valve 60 and the heat exchanger 46. The tapped flow passes to an ejector 76 which operates to draw a cooling stream of ram air through the heat exchanger 46 via a control valve 78 and then exhausts the flow overboard via a ram ejector control valve 80. Alternatively a fan may be provided to draw the stream ram air through the heat exchanger 46.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise.

The invention claimed is:

1. An on board inert gas generation system for use in an aircraft having a source of low pressure air, the gas generation system comprising:
   a variable speed rotary positive displacement compressor including an inlet configured to receive a first portion of the low pressure air and an outlet in flow communication with an air separation module, wherein the variable speed rotary positive displacement compressor is configured to provide variable flow to the air separation module;
   a heat exchanger disposed in a flow path between the positive displacement compressor and the air separation module, wherein the heat exchanger includes a heating pass and a cooling pass for fluid, wherein compressed air from the positive displacement compressor is passed along the cooling pass thereby to reduce a temperature of the compressed air supplied to the air separation module;
   a first duct configured to supply a second portion of the low pressure air to the heating pass of the heat exchanger; and
   a second duct configured to supply the second portion of the low pressure air from the heating pass of the heat exchanger to an input of a turbine.

2. The system of claim 1 wherein the low pressure air is cabin air from a pressurized cabin.

3. The system of claim 1, further comprising:
   the turbine, wherein the turbine is configured to receive and expand the second portion of the low pressure air from the heating pass of the heat exchanger.

4. The system of claim 3, wherein the turbine is drivably connected to the positive displacement compressor.

5. The system of claim 3, wherein the turbine is drivably connected to an electrical generator.

6. The system of claim 1, further comprising:
   an electric motor drivably connected to the positive displacement compressor.

7. The system of claim 5, further comprising:
   an electric motor drivably connected to the positive displacement compressor,
   wherein the electric motor is connectable to receive electrical energy from the generator or an energy storage arrangement associated therewith.

8. The system of claim 6, wherein the electric motor is connectable to receive electrical energy from an aircraft electrical supply.

9. The system of claim 7, further comprising:
   a power controller,
   wherein the power controller is configured to receive electrical energy from the generator or an electrical storage arrangement associated therewith,
   wherein the power controller is configured to receive electrical energy from an electrical supply of the aircraft,
   wherein the power controller is configured to controllably supply electrical energy to the electric motor, and
   wherein the electric motor is connectable to receive electrical energy from the electrical supply of the aircraft.

10. The system of claim 1, further comprising:
    a ram air duct configured to supply a relatively cool ram air to the heating pass of the heat exchanger.

11. The system of claim 10, further comprising:
    a valve configured to selectively supply the relatively cool ram air or the second portion of the low pressure air to the heat exchanger.

12. The system of claim 1, configured such that a portion of the compressed air from the positive displacement compressor is supplied to an ejector,
    wherein the ejector is configured to enhance a flow of coolant along the heating pass of the heat exchanger.

13. The system of claim 2, further comprising:
    the turbine, wherein the turbine is configured to receive and expand the second portion of the low pressure air from the heating pass of the heat exchanger.

14. The system of claim 13, wherein the turbine is drivably connected to the positive displacement compressor.

15. An on board inert gas generation system for use in an aircraft having a source of low pressure air, the gas generation system comprising:
    a variable speed rotary positive displacement compressor including an inlet configured to receive a first portion of the low pressure air and an outlet in flow communication with an air separation module, wherein the variable speed rotary positive displacement compressor is configured to provide variable flow to the air separation module;
    a heat exchanger disposed in a flow path between the positive displacement compressor and the air separation module, wherein the heat exchanger includes a heating pass and a cooling pass for fluid, wherein compressed air from the positive displacement compressor is passed along the cooling pass thereby to reduce a temperature of the compressed air supplied to the air separation module;
    a ram air duct configured to supply a relatively cool ram air to the heating pass of the heat exchanger;
    a first duct configured to supply a second portion of the low pressure air to the heating pass of the heat exchanger;
    a second duct configured to supply the second portion of the low pressure air from the heating pass of the heat exchanger to an input of a turbine; and
    a valve configured to selectively supply the relatively cool ram air or the second portion of the low pressure air to the heat exchanger, wherein the low pressure air is cabin air from a pressurized cabin.

16. The system of claim 15, further comprising:
    the turbine, wherein the turbine is configured to receive and expand the second portion of the low pressure air from the heating pass of the heat exchanger.

17. The system of claim 16, wherein the turbine is drivably connected to the positive displacement compressor.

18. The system of claim 16, wherein the turbine is drivably connected to an electrical generator.

* * * * *